United States Patent Office 3,401,159
Patented Sept. 10, 1968

3,401,159
BENZODIAZEPINE DERIVATIVES
Stanley C. Bell, Philadelphia, Pa., assignor to American Home Products Corporation, New York, N.Y., a corporation of Delaware
No Drawing. Continuation-in-part of application Ser. No. 134,569, Aug. 29, 1961. This application Feb. 14, 1966, Ser. No. 527,039
The portion of the term of the patent subsequent to Jan. 3, 1984, has been disclaimed
4 Claims. (Cl. 260—239.3)

ABSTRACT OF THE DISCLOSURE

The preparation of 3-acyloxy-3-alkyl-1,3-dihydro-2H-1,4-benzodiazepines, which exert anticonvulsant and ataractic effects in mammals, from 3-alkyl-1,3-dihydro 2H-1,4-benzodiazepine 4-oxides by rearrangement with a carboxylic acid anhydride is described.

---

This application is a continuation-in-part of co-pending application Ser. No. 134,569, filed Aug. 29, 1961, now abandoned.

This invention relates to compositions of matter classified in the art of chemistry as substituted 1,3-dihydro-2H-1,4-benzodiazepines, and process for making them.

The invention sought to be patented in its principal composition aspect, is described as residing in the concept of a chemical compound having a molecular structure in which there is attached to a 1,3-dihydro-5-aryl-2H-1,4-benzodiazepin-2-one nucleus, an alkyl and an acyloxy group at the 3-position.

The tangible embodiments of the composition aspects of the invention possess the inherent general physical properties of being high melting, white crystalline solids, are substantially insoluble in water, and are soluble in polar solvents, such as lower aliphatic alcohols. Examination of these compounds produced according to the hereinafter described process reveals upon infrared and nuclear magnetic resonance spectrographic analysis, spectral data confirming the molecular structure hereinbefore set forth. Thus the amide linkage, the ester linkage, the absence of hydrogen at the 3-position, and the undisturbed alkyl group at the 3-position are evident. The aforementioned physical characteristics taken together with the nature of the starting materials, and the mode of synthesis, positively confirm the structure of the compositions sought to be patented.

The tangible embodiments of the compositions of the present invention possess the inherent applied use characteristics of exerting anticonvulsant and ataractic effects in mammals as evidenced by pharmacological evaluation according to standard test procedures.

The tangible embodiments of the compositions of the present invention also possess the inherent applied use characteristic of being intermediates for the preparation of valuable benzodiazepin-2-ones with alkyl and amino groups at the 3-position possessing psycholeptic activity.

The invention sought to be patented in its principal process aspect resides in the concept of converting a 3-alkyl-1,3-dihydro-2H-1,4-benzodiazepine 4-oxide to a 3-acyloxy-3-alkyl-1,3-dihydro-2H-1,4-benzodiazepine by heating said 4-oxide with a carboxylic acid anhydride.

The process of making a specific embodiment of the compositions of the invention and the manner of using said specific embodiment of the compositions of the invention as an intermediate, are illustrated schematically as follows:

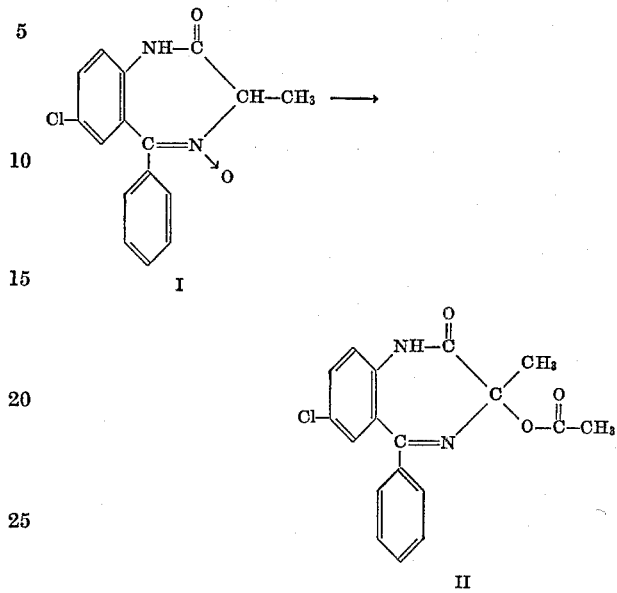

The manner and process of making and using the compositions of the invention will now be generally described so as to enable a person skilled in the art of chemistry to make and use the same as follows:

The 3-alkyl-1,3-dihydro-5-aryl-2H-1,4-benzodiazepin-2-ones (I) employed as starting materials in the process of the invention and for the preparation of the compositions of the invention are known in the art or are readily prepared by procedures known to those skilled in the art.

When a 1,3-dihydro-3-alkyl-2H-1,4-benzodiazepin-2-one 4-oxide (I) is heated with acetic anhydride, the applicant has discovered that, contrary to what would be expected by one with ordinary skill in the art of chemistry, the Boekelheide type of rearrangement (J.A.C.S., 76 1286 (1954) does not occur and surprisingly, even though the 3-position is hindered by an alkyl group, rearrangement to the 3-position (II) takes place selectively as though the alkyl group were not present to hinder such rearrangement. The reaction is preferably performed in the presence of acetic acid which serves as solvent. For best results the acetic anhydride is added slowly and the reaction mixture is maintained on a steambath. Excessive heating beyond 15 to 30 minutes is avoided since acylation at the 1-nitrogen would also occur. In lieu of acetic acid, a non-reactive solvent could be used provided its boiling range did not exceed ca. 200 C.

The desired product is isolated by removal of the solvent under reduced pressure.

Purification can be accomplished by recrystallization from a solvent such as ethanol or other low molecular weight alcohol.

It will be apparent from the disclosure herein to those skilled in the art that for the purposes of this invention, certain of the atoms of the benzodiazepine starting materials could be otherwise substituted or be substituted with groups which do not interfere with the subsequent reactions. Thus at the 1-nitrogen, an alkyl (e.g. methyl, ethyl, propyl) or acyl (acetyl, propionyl, etc.) group could be present in lieu of hydrogen. Similarly in lieu of doubly bonded oxygen at the 2-carbon, there can be two hydrogen atoms or an imino or alkylimino (e.g., methylimino, ethylimino, etc.) group.

At the 5-position instead of phenyl, heterocyclic aryl groups (e.g., thienyl, pyridyl, furyl) or alkyl (e.g., methyl, ethyl) can be present. The aryl groups can be unsubstituted or they can be substituted with groups such as halogen, trifluoromethyl, alkyl, or alkoxy or other groups which will not react under the reaction conditions or which will be expected to react under the reaction conditions to give the normally acylated product, and this is desired. The benzo-portion can be similarly unsubstituted or substituted with groups like those specified for the aryl group.

When the starting compounds are substituted as hereinbefore recited, it will be apparent herefrom to those skilled in the art of chemistry that the final product formed in the process of the invention will bear correspondingly the same substituents. Thus for the process of the invention and for the product of the invention produced thereby, such groups are the full equivalents of the invention as particularly claimed.

The following example illustrates the best mode contemplated by the inventor of using the claimed process of the invention and of the manner of making the claimed composition of the invention.

Example 1

To a suspension of 4.0 g. of 7-chloro-1,3-dihydro-3-methyl-5-phenyl-2H-1,4-benzodiazepin-2-one 4-oxide in 40 ml. of acetic acid, add, with stirring, an additional 20 ml. of acetic anhydride. Heat the resulting reaction mixture on a steambath for 15 minutes. Concentrate to dryness under reduced pressure. Recrystallize from ethanol to obtain 1.8 g. of 3-acetoxy-7-chloro-1,3-dihydro-3-methyl-5-phenyl-2H-1,4-benzodiazepin-2-one, M.P. 179–180°.

Analysis for $C_{18}H_{15}ClN_2O_2$.—Calculated: C, 63.07; H, 4.41; N, 8.17; Cl, 10.34. Found: C, 63.10; H, 4.38; N, 8.01; Cl, 10.5.

The following example illustrates the best mode of using the compounds of the invention as intermediates (III):

Example 2

Disolve 1.3 g. of 3-acetoxy-7-chloro-1,3-dihydro-3-methyl-5-phenyl-2H-1,4-benzodiazepin-2-one in 25 ml. of diethylamine and allow to stand at room temperature for 1 hour. Remove the solvent under reduced pressure and recrystallize the residue from ethanol to obtain 0.6 g. of 7 - chloro - 3 - diethylamino - 1,3 - dihydro - 3 - methyl - 5 - phenyl-2H-1,4-benzodiazepin-2-one, M.P. 178–179°.

Analysis for $C_{20}H_{22}ClN_3O$.—Calculated: C, 67.50; H, 6.09; N, 11.81; Cl, 9.96. Found: C, 67.24; H, 6.20; N, 11.49; Cl, 10.3.

The subject matter which the applicant regards as his invention is particularly pointed out and distinctly claimed as follows:

1. 3-acetoxy-1,3-dihydro-3-methyl-5-phenyl-2H-1,4-benzodiazepin-2-one.

2. The composition of claim 1 wherein the 7-position is substituted with chlorine.

3. The process for preparing 3-acetoxy-1,3-dihydro-3-methyl - 5 - phenyl - 2H - 1,4 - benzodiazepin - 2 - one comprising heating 1,3-dihydro-3-methyl-5-phenyl-2H-1,4-benzodiazepin-2-one 4-oxide with acetic anhydride.

4. The process of claim 3 wherein the 1,3-dihydro-3-methyl-5-phenyl-2H-1,4-benzodiazepin-2-one 4-oxide is substituted with chlorine at the 7-position and the product is correspondingly substituted.

References Cited

UNITED STATES PATENTS 3,296,249   2/1966   Bell _____ 260—239.3

HENRY R. JILES, *Primary Examiner.*

ROBERT T. BOND, *Assistant Examiner.*